L. AYA.
Shoe-Lace Fastener.
No. 203,696. Patented May 14, 1878.
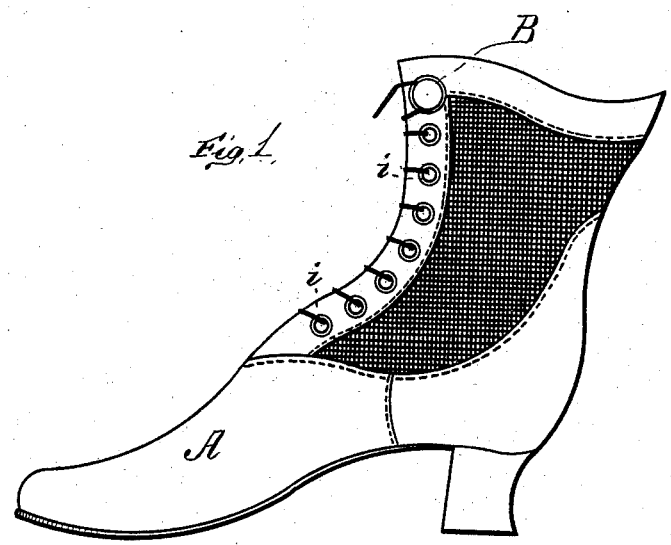
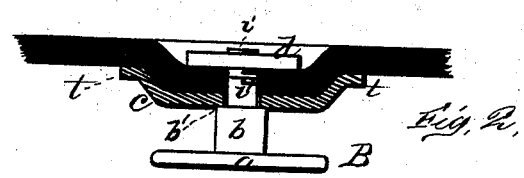
WITNESSES
INVENTOR
Louis Aya,
E.W. Anderson,
ATTORNEY
N. PETERS, PHOTO-LITHOGRAPHER, WASHINGTON, D.C.

UNITED STATES PATENT OFFICE.

LOUIS AYA, OF WINONA, MINNESOTA.

IMPROVEMENT IN SHOE-LACE FASTENERS.

Specification forming part of Letters Patent No. 203,696, dated May 14, 1878; application filed April 2, 1878.

*To all whom it may concern:*

Be it known that I, LOUIS AYA, of Winona, in the county of Winona and State of Minnesota, have invented a new and valuable Improvement in Fasteners for Shoe-Lacings; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a shoe with my improvement in shoe-lacing fastener applied. Fig. 2 is a section of the shoe, showing the operation of the fastener.

The nature of the invention consists in a shoe-lace fastening having a head and threaded shank, shouldered next said head, a nut into which said shank is screwed, and a concave bearing-plate, as hereinafter shown and described.

In the annexed drawings, the letter A designates an ordinary laced shoe, in connection with which my invention will be illustrated, having spaced eyeleted holes $i$ along the vamp, through which the lacing is passed from side to side to fasten the shoe upon the foot. The lacing being completed, the remainder of the thong is wound around a button, B, and the end thereof inserted between the ankle and shoe. This button is composed of a head, $a$, of suitable size, having a projecting shank, $b$, having a shoulder, $b'$, next its head, and screw-threaded, as shown at $i'$, at its extremity, a concave plate, $c$, having bearing-flanges $t$, and a nut, $d$. The plate $c$ has a central aperture, sufficiently large to snugly receive the rabbeted portion of the shank, and when in position bears against its shoulder $b'$, as shown in Fig. 2.

An orifice is made in the shoe, and the shank passed through it and screwed forcibly into the nut. By this means the nut causes the leather to conform to the shape of the plate, its inner face being inside of the corresponding face of the bearing-flange $t$, so that the said nut does not come in contact with the ankle, and cannot consequently injure the same.

It will be seen that the flange $t$ is the bearing-surface of the button, and, being of considerable breadth, that it cannot injure the foot.

I am aware that curtain-cord holders have been made with curved washers, and that it is not new to provide a serrated screw clutch or clamp for shoe-strings; but I do not desire to claim a screw-clamp broadly.

What I claim as new, and desire to secure by Letters Patent, is—

The shoe-lace fastening consisting of the head $a$, having threaded shank $b$, shouldered at $b'$ next said head, the nut $d$, and the concave bearing-plate $c$, substantially as specified.

In testimony that I claim the above I have hereunto subscribed my name in the presence of two witnesses.

LOUIS AYA.

Witnesses:
O. B. GOULD,
C. G. MAYBURY.